US008518136B2

(12) United States Patent
Weise

(10) Patent No.: US 8,518,136 B2
(45) Date of Patent: Aug. 27, 2013

(54) FILTER INSERT AND METHOD FOR PRODUCING THE FILTER INSERT

(75) Inventor: Ulich Weise, Butzbach (DE)

(73) Assignee: Weise Water System GmbH (DE)

( * ) Notice: Subject to any disclaimer, the term of this patent is extended or adjusted under 35 U.S.C. 154(b) by 0 days.

(21) Appl. No.: 13/122,105

(22) PCT Filed: Sep. 25, 2009

(86) PCT No.: PCT/DE2009/001350
§ 371 (c)(1), (2), (4) Date: Mar. 31, 2011

(87) PCT Pub. No.: WO2010/037365
PCT Pub. Date: Apr. 8, 2010

(65) Prior Publication Data

US 2011/0192123 A1 Aug. 11, 2011

(30) Foreign Application Priority Data

Oct. 1, 2008 (DE) ........................ 10 2008 049 865

(51) Int. Cl.
*B01D 46/02* (2006.01)

(52) U.S. Cl.
USPC ................ 55/341.1; 55/378; 55/428; 55/483; 55/484

(58) Field of Classification Search
USPC .................. 55/378, 379, 368, 380, 483, 484, 55/492, 506, 508, DIG. 12, DIG. 31; 210/323.2, 331, 346, 493.1, 493.5
See application file for complete search history.

(56) References Cited

U.S. PATENT DOCUMENTS

| | | | | |
|---|---|---|---|---|
| 4,312,648 | A * | 1/1982 | Day | 55/378 |
| 5,298,044 | A * | 3/1994 | Sutton et al. | 55/378 |
| 5,635,062 | A * | 6/1997 | Cameron et al. | 210/232 |
| 5,695,535 | A * | 12/1997 | Hintenlang et al. | 55/379 |
| 5,910,247 | A * | 6/1999 | Outterside | 210/487 |
| 5,914,413 | A * | 6/1999 | Andersson et al. | 55/378 |
| 8,029,585 | B2 * | 10/2011 | Sundvik et al. | 55/378 |

* cited by examiner

*Primary Examiner* — Duane Smith
*Assistant Examiner* — Minh-Chau Pham

(57) ABSTRACT

The invention relates to a filter insert with a filtrate collecting chamber (4) which is connected to several filter bags (1) via a connecting plate (3). The connecting plate (3) includes longitudinal webs (5) for bridging joints (6) between the frames (14) of individual filter bags (1). The connecting plate (3) is sealingly welded to the filter bags (1) and the filtrate collecting chamber (4).

9 Claims, 2 Drawing Sheets

FILTER INSERT AND METHOD FOR PRODUCING THE FILTER INSERT

CROSS-REFERENCE TO RELATED APPLICATIONS

This application is a U.S. National Stage of International application Ser. No. PCT/DE 2009/001350 filed on Sep. 25, 2009, which claims benefit of priority to German Application Ser. No. 102008049865.3 filed on Oct. 1, 2008, which is incorporated by reference herein.

TECHNICAL FIELD

The invention relates to a filter insert having a plurality of filter bags, a filtrate collecting chamber confining a filtrate collecting space and enclosing several filter bags in a pot-shaped manner, a filtrate outlet of the filtrate collecting chamber and a frame of the filter bags, wherein the frames of adjacent filter bags are sealingly connected to each other and the filtrate collecting chamber is sealingly connected to the filter bags. Further, the invention relates to a method for producing the filter insert.

BACKGROUND

A filter insert of the above specified kind is known for example from EP1016449B1. In this filter insert the individual filter bags are sealed one against the other by means of cast resin. Connections of the filter bags are formed after hardening of the cast resin. As a result, the sealing of the filter bags one to the other is rather complex.

Further, it is known in the art to insert a heating wire between abutting edges of the frames of adjacent filter bags. The heating wire is energized and the frames of adjacent filter bags are welded together. The heating wire then remains in the filter insert. This configuration leads also to a huge effort for sealing the filter bags one against the other.

The leak tightness of the connection of the filter bags one against the other at the filtrate collecting space is, however, crucial for this kind of filter insert, because at this very position the dirty section is separated from the clean section which comprises the filtrate collecting space. Since the filter insert mostly comprises a multitude of filter bags the filtrate collecting space has a multitude of sealing points.

SUMMARY

It is an object of the invention to construct a filter insert of the kind specified above such that the filtrate collecting space is reliably sealed and that the effort for achieving the sealing is minimal. In addition, a method for producing the filter insert which is especially simple and cost-efficient in its application is to be established.

According to the invention the first problem is solved by the fact that the filtrate collecting chamber is sealingly connected to a connecting plate, that the connecting plate comprises several longitudinal webs and that the longitudinal webs each connect frames of adjacent filter bags.

In this configuration the longitudinal webs of the connecting plate bridge the frames of adjacent filter bags and ensure the sealing of the filter bags one against the other. The connecting plate thus comprises at least as many longitudinal webs as the filter insert according to the invention has joints to be sealed between adjacent filter bags. In this case the longitudinal webs rest across the joints of adjacent filter bags. This results in a particularly large sealing area which comprises also a direction change in order to seal the frames one against the other and against the longitudinal webs. In this way the filtrate collecting chamber is especially reliably sealed.

The connecting plate contributes to a particularly high stability of the filter insert according to the invention, if the longitudinal webs of the connecting plate bridge the butt joints between the frames of adjacent filter bags. For this reason, mechanical loads on the filter bags will not lead to a defect in the liquid tightness of the filtrate collecting space.

A particularly reliable sealing of the filter bags one against the other can easily be achieved in accordance with a further advantageous embodiment of the invention, if the frames of adjacent filter bags are welded to the longitudinal webs of the connecting plate.

According to a further advantageous embodiment of the invention, the welding of the frames to the connecting plate will result in a high stability and reliable tightness, if the welding of the frame to the connecting plate is two-dimensional. The two-dimensional welding is preferably produced in a mirror welding process wherein the surface of the interconnected frames which is to face the connecting plate and the connecting plate itself are each partially melted by means of a welding mirror. In the process of this partial melting the butt joints between the frames are already fused with each other. After a subsequent pressing together of the partially melted surfaces of the frames and the connecting plate the component parts are welded together two-dimensionally. Forces acting between the frames of adjacent filter bags will be absorbed by the longitudinal webs of the connecting plate. Due to this configuration the filter insert according to the invention has a particularly high stability.

The filter insert according to the invention has a high stability, if the longitudinal webs of the connecting plate are connected to each other by means of cross webs and if the cross webs and the longitudinal webs delimit apertures for connecting channels of the frame with the filtrate collecting space. Furthermore, the apertures ensure a reliable connection of the channels with the filtrate collecting space so that, after the sealing connection of the connecting plate to the frame of the filter bags is achieved, a simple visual check verifies the accessibility of the individual channels of the filter bag frames.

The manufacture of the filter insert according to the invention is further simplified, if the filter bag frames and the connecting plate are made of the same thermoplastic material.

According to a further advantageous embodiment of the invention, a sealing connection between the filtrate collecting chamber and the connecting plate proves to be especially simple, if the filtrate collecting chamber or the collecting plate comprise a circumferential groove while the respective other member vis-à-vis comprises a lip engaging in the groove. In addition, this configuration enables a reliable alignment of the filtrate collecting chamber in regard of the connecting plate.

The lip of the filtrate collecting chamber or of the connecting plate could, for example, be glued in place in the groove of the respective other member vis-a-vis. According to a further embodiment of the invention the sealing of the filtrate collecting space is simplified, however, if the groove and the lip of the filtrate collecting chamber and of the collecting plate are sealingly welded.

The second problem, namely the accomplishment of a method for producing the aforementioned filter insert which is especially simple and cost-efficient in its application, is solved according to the present invention by frames of adjacent filter bags which are partially melted in a two-dimensional areas at their side facing the filtrate collecting space and longitudinal webs of a connecting plate for a filtrate collecting chamber which are partially melted in two-dimensional areas and by pressing the partially melted component parts one against the other.

As a result of this configuration a butt joint between the frames of adjacent filter bags is bridged by longitudinal webs of the connecting plate. The welding of the longitudinal webs with the frames covers the whole of the surface of the longitudinal webs. Thus, the welding is capable of absorbing high forces and ensures a reliable sealing of the filtrate collecting space.

BRIEF DESCRIPTION OF THE DRAWINGS

The invention allows a multitude of embodiments. For further clarification of its basic principle one of these embodiment is represented in the drawing and is described below, wherein.

DETAILED DESCRIPTION OF EXAMPLE EMBODIMENTS

Figure 1:
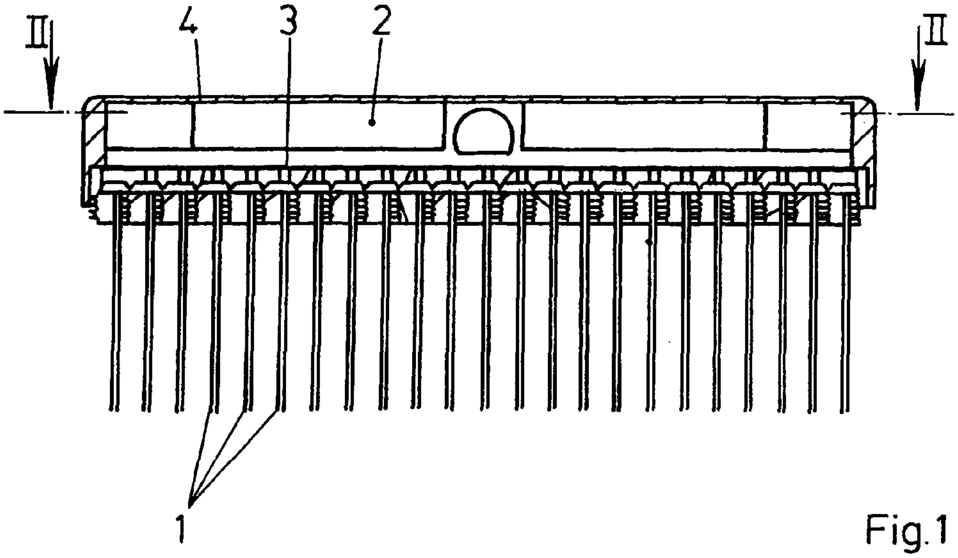
FIG. 1 shows a filter insert according to the invention in transverse section.

FIG. 1 shows a filter insert having a plurality of filter bags 1 and a filtrate collecting space 2. The filtrate collecting space 2 comprises a pot-shaped filtrate collecting chamber 4 being sealingly connected with a connecting plate 3. Connecting plate 3 conjoins the filtrate collecting chamber 4 with the filter bags 1.

Figure 2:
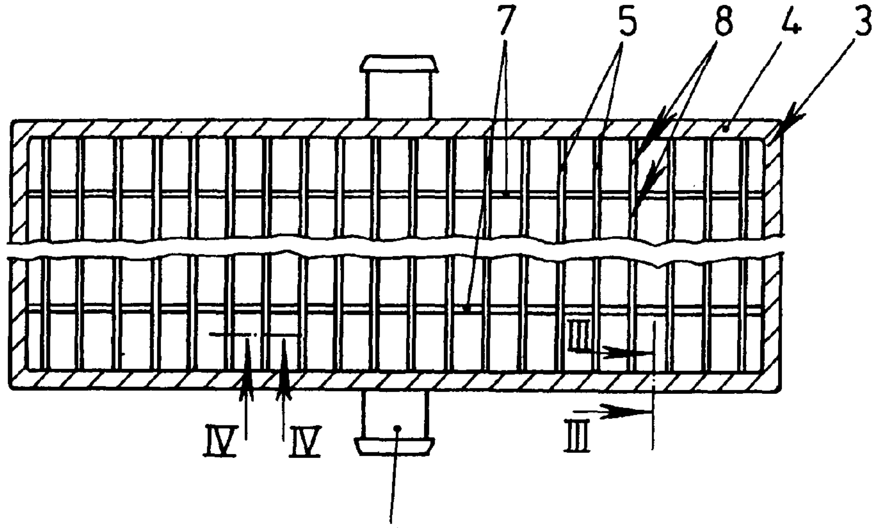
FIG. 2 depicts a sectional view cut through the filter insert of FIG. 1 along the line II-II.
Figure 4:
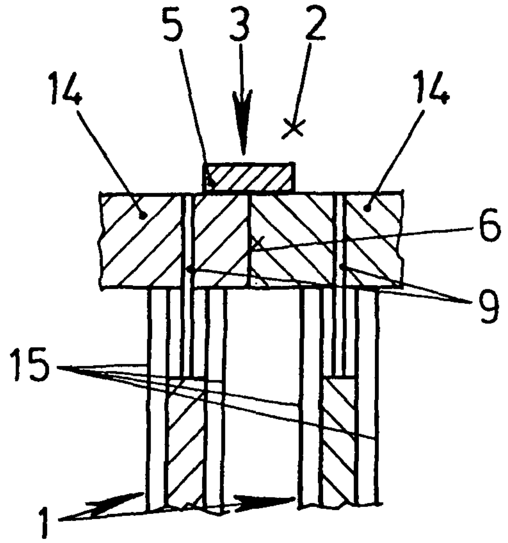
FIG. 4 shows an enlarged sectional view of a sealing of adjacent filter bags of FIG. 2 cut along the line IV-IV.

FIG. 2 shows a sectional view cut through the filtrate collecting chamber 4 of FIG. 1 along the line II-II. It can be seen that the connecting plate 3 comprises a multitude of longitudinal webs 5. The number of longitudinal webs 5 corresponds exactly to the number of butt joints 6 of adjacent filter bags 1 which are depicted in FIG. 4. Thus, the filter insert has one filter bag 1 in excess of the number of longitudinal webs 5. Furthermore, the longitudinal webs 5 are interconnected by means of cross webs 7. The longitudinal webs 5 and the cross webs 7 delimit apertures 8 through which channels 9 of the filter bags 1 shown in FIG. 4 are connected with the filtrate collecting space 2. The filtrate collecting chamber 4 comprises a connecting tube 10 for discharging the filtered medium.

Figure 3:
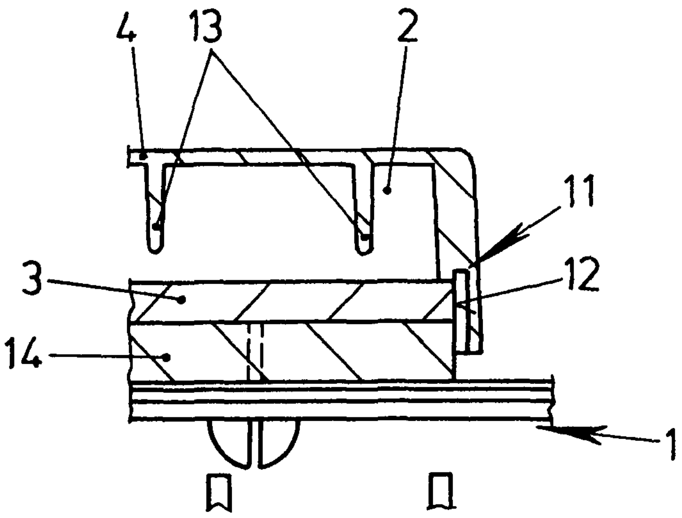
FIG. 3 is an enlarged sectional view of a sealing of a filtrate collecting space of the filter insert of FIG. 2 cut along the line III-III.

FIG. 3 shows in an enlarged sectional view cut along line III-III of FIG. 2 the sealing connection of the filtrate collecting chamber 4 to the connecting plate 3. It can be seen that the filtrate collecting chamber 4 comprises a circumferential groove 11 in which a circumferential lip 12 of the connecting plate 3 is welded. The filtrate collecting chamber 4 has several supporting webs 13 for guiding the filtered medium. The supporting webs 13, moreover, reinforce the filtrate collecting chamber 4. The filter bag 1 has a frame 14 which is welded to the connecting plate 3.

FIG. 4 is an enlarged sectional view through the fixation of two adjacent filter bags to the connecting plate 3. It can be seen that the filter bags 1 comprise planar filter media 15. A space between the frames 14 and the filter media 15 is connected to the filtrate collecting space 2 by means of channel 9 passing through frame 14. Longitudinal web 5 of connecting plate 3 is welded over the butt joint 6 of frame 14 of the adjacent filter bags 1.

For the manufacture of the filter insert the individual filter bags 1 pre-fitted with the filter media 15 are at first arranged and the upper side of the frames 14 at the butt joints 6 is partially melted by means of a welding mirror. Afterwards one side of the connecting plate 3 is also partially melted by means of a welding mirror. The partially melted areas of the filter bags 1 and of the connecting plate 3 are then pressed against each other. After cooling down the groove 11 of the filtrate collecting chamber 4 and lip 12 of the connecting plate 3 are partially melted and pressed against each other. Thus, the component parts of the filter insert are connected with each other and the filtrate collecting space 2 is reliably sealed.

The invention claimed is:

1. A filter insert having a space for collecting a filtrate, the space being reliably sealed, the filter insert comprising:

- a plurality of filter bags, each filter bag connected to each of a plurality of frames, wherein the frames of adjacent filter bags are sealingly connected to each other;
- a filtrate collecting chamber sealingly connected to the filter bags and having a filtrate outlet for removing collected filtrate from the filter insert, the filtrate collecting chamber adapted to form a filtrate collecting space and adapted to enclose the filter bags in a pot-shaped manner; and
- a connecting plate sealingly connected to the filtrate collecting chamber, the connecting plate comprising a plurality of longitudinal webs that connect the frames of adjacent filter bags to each other.

2. The filter insert of claim 1, wherein the longitudinal webs of the connecting plate bridge butt joints between the frames of adjacent filter bags.

3. The filter insert of claim 2, wherein the frames of adjacent filter bags are welded to the longitudinal webs of the connecting plate.

4. The filter insert of claim 3, wherein the welding location of the frames and the connecting plate is two-dimensional.

5. The filter insert of claim 4, wherein the longitudinal webs of the connecting plate are interconnected by cross webs and wherein the cross webs and the longitudinal webs delimit apertures for connecting channels of the frames and the filtrate collecting space.

6. The filter insert of claim 5, wherein the frames of the filter bags and the connecting plate are made of the same thermoplastic material.

7. The filter insert of claim 6, wherein the filtrate collecting chamber or the connecting plate comprises a circumferential groove and wherein the respective other member comprises a lip engaging in the groove.

8. The filter insert of claim 7, wherein the groove and the lip of the filtrate collecting chamber and the connecting plate are sealingly welded.

9. A method for producing a filter insert according to claim 1, comprising:

- partially melting in a laminary area the frames of adjacent filter bags at a side facing the filtrate collecting space;
- partially melting in a laminary area the longitudinal webs of the connecting plate sealingly connected to the filtrate collecting chamber; and
- pressing the partially melted component parts one against the other.

* * * * *